United States Patent [19]

Bechthold

[11] 4,435,341

[45] Mar. 6, 1984

[54] METHOD OF MANUFACTURING AMMONIUM SULFATE GRANULES

[75] Inventor: Horst Bechthold, Erftstadt-Friesheim, Fed. Rep. of Germany

[73] Assignee: Buckau-Walther AG, Grevenbroich, Fed. Rep. of Germany

[21] Appl. No.: 355,533

[22] Filed: Mar. 8, 1982

[30] Foreign Application Priority Data

Mar. 10, 1981 [DE] Fed. Rep. of Germany ....... 3108986

[51] Int. Cl.³ ............................................. B01J 2/00
[52] U.S. Cl. ........................................ 264/7; 264/13; 264/117
[58] Field of Search .............................. 264/13, 7, 117

[56] References Cited

U.S. PATENT DOCUMENTS 2,685,537  8/1954  Dunmire ................................. 264/7
2,811,748  11/1957  Smith ..................................... 264/13
4,277,426  7/1981  Kato et al. ............................. 264/13

*Primary Examiner*—James R. Hall
*Attorney, Agent, or Firm*—Michael J. Striker

[57] ABSTRACT

A method of manufacturing ammonium sulfate granules in which a starting solution of ammonium sulfate is spray dried, thereafter granulated by the addition of finely sprayed, highly concentrated water solution of ammonium sulfate.

5 Claims, No Drawings

METHOD OF MANUFACTURING AMMONIUM SULFATE GRANULES

BACKGROUND OF THE INVENTION

The present invention relates in general to granulation of ammonium sulfate, and in particular to a method of manufacturing granules of ammonium sulfate during which a starting solution of the ammonium sulfate is spray dried and the resulting finely divided solid ammonium sulfate is, without delay, granulated by means of a finely sprayed aqueous medium, and thereupon the granules are dried.

Mineral fertilizers are normally brought to market in the form of pellets of a substantially uniform size of their grain. Also it is desired that the various components of the fertilizer be applied onto the field in a well mixed condition. In most cases, such fertilizing mixtures are already prepared in advance by the suppliers. Frequently it is also desired that the individual components of such mixed fertilizers be produced separately during their manufacture, in order to facilitate during their subsequent treatment the mixture in any desired proportion.

Due to different physical qualities of the various components of the mixed fertilizers, problems may occur during transportation of such mixtures because separation of the constituents may occur as a result of vibrations of the conveying device. The cause of such separations may be either the size of the grains or the shape of the grains. The mixed fertilizing product therefore tends to reach the consumer in a separated condition, and consequently a uniform application of the fertilizer onto the ground is no longer achievable.

As mentioned before, the decomposition problems occur particularly in the case when not only the grain size but also the grain configuration of respective components is different. For example, ammonium sulfate is customarily delivered in a crystallized condition. These crystals are predominantly substantially smaller than the grains of pelletized fertilizers. For this reason, the mixing of ammonium sulfate crystals with other fertilizing components is particularly susceptible to the aforementioned problems.

In addition, the crystallization of ammonium sulfate is a relatively difficult process, and accordingly the production of large crystals of ammonium sulfate is very expensive. Moreover, even if large crystals of ammonium sulfate are produced, there still would remain a substantial difference in the shape of the crystals relative to the grains of the pelletized fertilizing agent, and the danger of decomposition would still be present.

In view of these difficulties, prior-art methods described, for example, in the U.S. Pat. No. 4,305,748, assigned to the same assignee, has already achieved conversion of spray dried ammonium sulfate in crystalline form into pellets or granules. For this purpose, about 6-8% water (relative to the dry substance) has been finely sprayed on the spray-dried ammonium sulfate present on a pelletizing plate. During this process very uniform, almost spherical granules were produced which, already in the moist condition, proved to be very strong. Subsequent drying of these pellets yielded a product which was suitable for treatment in conventional fertilizing devices. This known fertilizer is sufficiently abrasion-resistant and, by suitably adjusting the pelletizing process, it can be manufactured in a wide variety of individual grain sizes.

Originally, the cause of this surprising effect of the prior-art method was unknown. Only after experiments were made to pelletize in this manner products from preceding manufacturing periods, was it recognized that a product stored for a prolonged period of time is extremely difficult to pelletize, and that the strength of pellets produced from such an old material is substantially lower in comparison with pellets produced from a fresh starting material. Further investigation of the properties of starting materials has shown that the aged starting material exhibits a distinct enlargement of crystals. Accordingly, it was recognized that crystalline ammonium sulfate is hardly suitable for pelletization.

This conclusion is understandable when one considers the fact that smooth large-area crystals of ammonium sulfate are probably subject to smaller adhesive forces than the substantially spherical, porous agglomerates composed of microcrystals only as normally grown during the spray drying.

During tests with manufacturing of pellets, another surprising effect of the drying process was found. In experiments directed to find a minimum residual moisture the pellets were occasionally subjected to a thermal treatment which substantially exceeded the time period normally required for the drying process itself. It was found that, depending on the duration of this thermal aftertreatment, an increased strength of the manufactured pellets was achieved.

In summary, by this known method according to the U.S. Pat. No. 4,305,748, the produced granulates possess a very high pressure- and abrasion-resistance, which nonetheless is still capable of a further improvement.

SUMMARY OF THE INVENTION

It is therefore a general object of the present invention to increase the pressure- and abrasion-resistance of known ammonium sulfate granules.

In keeping with this object, and others which will become apparent hereafter, one feature of this invention resides, in the method of the aforedescribed type, in granulating the spray-dried ammonium sulfate powder by spraying it with a highly concentrated aqueous solution of ammonium sulfate. The sprayed-on amount of the solution is about 5–20% by weight of the spray dried ammonium sulfate. The concentration of the solution amounts approximately to between 30 and 50%, whereby the results tend to be better at the higher concentration limit. The measures according to this invention improve especially the abrasion-resistance of the granules. This abrasion-resistance is of particular importance both in the pneumatic conveying of the final product and, also, in transportation in bags because during the loading of the bags the grains of ammonium sulfate move relative to each other at a substantial pressure.

The effect of the step according to this invention will now be described in greater detail.

First, it has already been mentioned in connection with the description of prior-art methods of this kind according to U.S. Pat. No. 4,305,748, that pelletizing of ammonium sulfate is facilitated particularly due to the fact that, during the spray drying treatment, spherical dust particles of different diameters will result which, upon addition of finely divided water particles on a pelletizing plate, agglomerate into larger granules of an almost spherical configuration. The added water not only affects the formation of nuclei of the granules but also dissolves a small amount of ammonium sulfate on the upper surface of the original dust grains. As a consequence of this partial dissolution, new microcrystalls are formed in the course of the subsequent drying process between the contact points of adjoining grains, and these microcrystals can be considered as the cause of the high strength of the produced pellets.

The application of a highly concentrated water solution of ammonium sulfate instead of pure water as employed in prior art, causes, particularly when the dosing is increased, a large number of additional crystals to grow in the interspaces between the dust grains during the subsequent drying process. These grown crystals create an additional bonding, apart from the contact points of the dust particles. As a result, not only the strength of such treated granules is increased, but also their abrasion-resistance, inasmuch as grains situated on the outer surface of a pellet are not so firmly embedded in the entire pellet structure as are the grains located in the interior of the pellet.

It is those outer surface grains of the pellets, however, which are better embedded by the sprayed-on concentrated aqueous solution of ammonium sulfate according to this invention, so that, even under conditions of increased abrasion, they are capable of withstanding such adverse conditions.

The aforementioned thermal aftertreatment of pellets produced according to the known method is advantageous also in the method of this invention. For example, the treatment temperature can be selected in the range from 80° to 150° C., preferably between 90° and 120° C. The after-treatment period is selected between 20 and 80 minutes, preferably between 30 and 50 minutes.

According to another feature of this invention, the pelletizing process is completed within the time span of 1 month maximum, starting from the spray drying; preferably, the pelletizing process is completed in a time period of less than 8 days.

It will be understood that each of the steps described above may also find a useful application in other types of methods differing from the types described above.

While the invention has been illustrated and described as embodied in a method for manufacturing ammonium sulfate granules, it is not intended to be limited to the details shown, since various modifications and material changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of manufacturing ammonium sulfate granules, having useful properties of increased resistance to applied pressure and abrasion, comprising
    (a) spraying a solution of ammonium sulfate to form it into finely divided droplets,
    (b) drying said droplets to form fine particles of ammonium sulfate,
    (c) spraying onto said fine particles an aqueous solution containing 30–50% ammonium sulfate, and
    (d) drying said particles to form ammonium sulfate granules having improved resistance to pressure and abrasion.

2. The method of claim 1, wherein in step (c) the amount of sprayed aqueous solution is 5–20% of the dried ammonium sulfate particles in step (b).

3. The method of claim 1, wherein step (c) is performed within a period of one month after step (b), and preferably less than 8 days thereafter.

4. The method of claim 1, wherein following step (d) said granules are heated to a temperature between 80° and 150° C., and preferably between 90° and 120° C.

5. The method of claim 4, wherein said heating step is for a period of time between 20 and 80 minutes, and preferably between 30 and 50 minutes.

* * * * *